Patented May 9, 1933

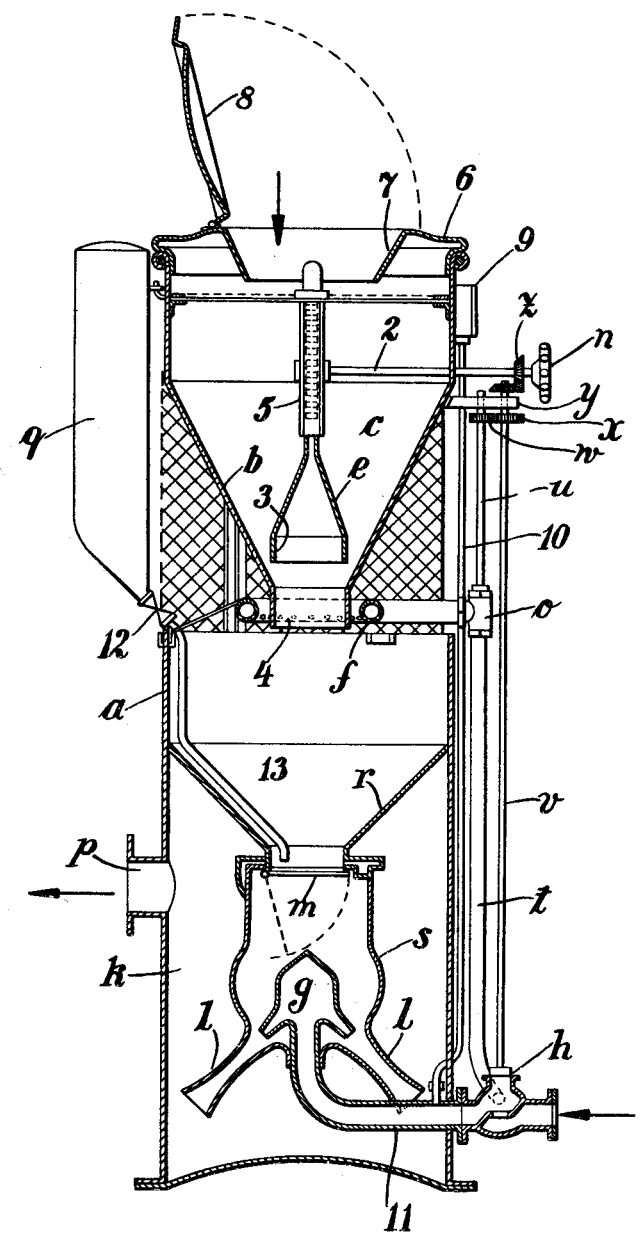

1,907,733

UNITED STATES PATENT OFFICE

HANS BURMEISTER, OF BERLIN, GERMANY, ASSIGNOR TO PYRENE-MINIMAX CORPORATION, A CORPORATION OF DELAWARE

APPARATUS FOR THE PRODUCTION OF FOAM GENERATING LIQUIDS OR FIRE FOAM

Application filed August 1, 1927, Serial No. 209,756, and in Germany August 28, 1926.

My invention relates to apparatus for the production of fire extinguishing foam. It has heretofore been proposed to employ an injector as a means for adding foam generating chemicals to a stream of water or other liquid.

I have discovered that such an apparatus may be greatly improved and its efficiency greatly increased by dividing the stream and causing it to pass through a plurality of small injectors arranged to operate in parallel instead of through a large injector or a series of large injectors through which the entire stream flows such as have heretofore been used.

I have also found that the efficiency of the injectors is still further improved by arranging them so that instead of discharging directly into the foam discharge pipe or hose, they discharge into an enlarged chamber from which the foam is subsequently discharged by a pipe or hose. By locating the foam discharge pipe in the upper portion of this chamber, only foam tends to be discharged therethrough, the unreacted chemicals and water tending to settle to the bottom until foam is generated. This arrangement also provides increased opportunity for the foam generating agents to mingle with or dissolve in the stream, thereby enabling the chemicals to fully react and be utilized for foam production before the foam stream is ultimately discharged from the hose, and permit of the use of a shorter hose than was heretofore needed.

A further improvement consists in constructing the apparatus so that all its functions may be regulated by a single operating means. This is attained by operating the main stop valve of the water supply, the valve for the water spraying and the closing member of the receptacle for the chemicals from a central position by means of a handwheel. As the introduction into the stream of the foaming agents, preferably mixed with additional water, is to be effected by the injector action, it is important that when starting the apparatus the full force of the injector or injectors should be quickly attained and that the chemicals should be furnished to the injectors as required without interfering with the action of the injector. This may be attained by giving the main stop valve and the valve for the spraying pipe excessively large dimensions so that when these stop members are only slightly opened the full pressure is at once set up in the injector or injectors and the spraying pipe. When these stop members are then further opened a greater working power of the injector and the spraying pipe does not take place. The stop member of the receptacle for the chemicals is, on the other hand, so designed that its lower part is made cylindrical and fits into a cylindrical guide in the lower part of the receptacle. If when starting the apparatus the handwheel is operated, the stop members for the injector supply pipe and the spraying pipe are first opened and the cylindrical part of the stopping member for the receptacle containing the chemicals is pulled out of the cylindrical guide in the lower part of the receptacle for the chemicals. With this arrangement, until the cylindrical part of the stopping member of the receptacle for the chemicals is withdrawn, although the water stop members may be opened, the chemicals cannot drop into the injector mouths. Only when the cylindrical part mentioned is quite free, do the chemicals drop down. The water stopping members have been in this case opened so far that the full water pressure is set in the apparatus.

In order to attain in special cases a considerable improvement of the chemical action of the apparatus as fire extinguishing implement, an additional receptacle may be according to my invention provided upon the apparatus. In this receptacle are stored chemicals of particularly high fire choking qualities, more particularly liquids, as for instance carbon tetrachloride. The receptacle is provided with a suitable discharge pipe. When starting the apparatus this discharge pipe is opened and carbon tetrachloride together with foam generating chemicals flows into the suction chamber of the injector. In this way a gas-containing foam is produced which also contains carbon tetrachloride or other suitable chemicals whereby the extinguishing action of the fire foam is considerably increased.

The accompanying drawing illustrates an embodiment of my invention by way of example.

In the single figure of the drawing my improved apparatus is shown in vertical section.

Referring to the drawing $a$ is the lower part of the apparatus into which a funnel $r$ is fixed in an airtight manner, so that underneath this funnel is formed an expansion chamber $k$ for the injector. This injector is, as already mentioned, designed as multiple injector, in such a manner that the outlet of the funnel $r$ is joined by the injector casing $s$ upon which are provided the injector nozzles $l$. Preferably five of these nozzles will be provided. Inside this casing $s$ is accommodated the injector head $g$ which is provided with the jet nozzles equal in number with the injector nozzles $l$. Below the mouth of the funnel is located a flap valve $m$, which is designed as a float so that it closes as soon as the contents of the casing $s$ have risen up to the outlet of the funnel. The expansion chamber $k$ is provided with a lateral outlet branch $p$ to which is joined the foam discharge pipe. A plurality of such branch pipes may be provided.

From the valve $h$ regulating the passage of the water under pressure to the injector head $g$ branches off a pipe $t$ which leads to the spraying device $f$. Into this pipe is placed a valve $o$. The spraying device is provided in its bottom part with two rows of perforations, one of which directs the jets of water against the walls of the casing $a$, while the jets issuing from the other row of perforations are directed towards the central longitudinal axis of the apparatus. The first mentioned jets of water serve for flushing the funnel $r$, while the last mentioned jets serve to spray the chemicals dropping down from the receptacle $c$.

The spindles $u$ and $v$ of the valves $h$ and $o$ are extended and positively connected by two pinions $w$ and $x$. The spindle $v$ carries also a bevel-wheel $y$ in gear with a bevel-wheel $z$ upon a horizontally mounted spindle 2 upon the free end of which is mounted a handwheel $n$. When this handwheel is turned, the valves $o$ and $h$ are opened. The stop member $e$ for the receptacle $c$ is, as already mentioned, provided with a cylindrical continuation 3 adapted to extend into a cylindrical guide 4 in the bottom of the receptacle for the chemicals for the purpose of sealing the receptacle $c$. The stop member $e$ is supported by a rack 5 with which gears a pinion mounted upon the end of the spindle 2 and not visible in the drawing. When rotating the handwheel not only the valves $h$ and $o$ are opened, but the stop member $e$ is also withdrawn from its cylindrical guide 4. Owing to the provision of the cylindrical extension 3 upon the closing member $e$ the receptacle $c$ is, however, only opened after the valves $o$ and $h$ have already been opened.

The container $c$ for the chemicals is closed by a cover 6 which is provided with a funnel-shaped charge opening 7 for the chemicals. This opening is adapted to be closed by means of a cover 8. The cover 6 designed as just described may, however, be omitted. At the side of the receptacle $c$ for the chemicals is provided a pressure gauge 9, the pressure pipe 10 of which is connected with the pipe 11 supplying the water under pressure to the injectors, so that the working pressure may be read off on this gauge.

At the other side of the receptacle $c$ for the chemicals is provided a storage vessel $q$ for, preferably liquid, chemicals, for instance carbon tetrachloride, the discharge pipe 13 of which provided with the valve 12 leads to the outlet of the funnel $r$.

Various changes and modifications may be made without departing from the spirit of my invention and the ambit of my claims and I desire, therefore, that only such limitations shall be placed thereon as are imposed by the prior art.

I claim:

1. In apparatus for producing foam, means for producing a stream, means for storing foam producing chemicals, and means for the addition of the foam producing chemicals to the stream comprising a plurality of small injectors arranged to be operated by said stream in parallel, and being adapted to receive chemicals from said storing means, a common chamber into which said injectors discharge, and a foam delivery pipe leading from the wall of said chamber at a point substantially out of direct line with said injectors.

2. In apparatus for producing foam, means for producing a stream, means for storing foam producing chemicals, and means for the addition of the foam producing chemicals to the stream comprising a plurality of small injectors arranged to be operated by said stream in parallel and being adapted to receive chemicals from said storing means, a common chamber into which said injectors discharge, a foam delivery pipe leading from said chamber, valves controlling the flow of said stream and of said chemicals to the injectors, and a single control device for operating said valves.

3. In apparatus for producing foam, means for producing a stream, means for storing foam producing chemicals, and means for the addition of the foam producing chemicals to the stream comprising a plurality of small injectors arranged to be operated by said stream in parallel and being adapted to receive chemicals from said storing means, a chamber into which said injectors discharge, a foam delivery pipe leading from said chamber out of direct line with said injectors, and a spraying device for washing said chemicals into said injectors.

4. In apparatus for producing foam, means for producing a stream, means for storing foam producing chemicals, and means for the addition of the foam producing chemicals to the stream comprising a plurality of small injectors, a chamber into which said injectors discharge, a foam delivery pipe leading from the wall of said chamber at a point substantially out of line with and in a direction at an angle to the axes of said injectors, a valve controlling the flow of the stream to said injectors, a receptacle for chemicals positioned above said injectors, and a valve for controlling the flow of chemicals to said injectors.

5. In apparatus for producing foam, means for producing a stream, means for storing foam producing chemicals, and means for the addition of the foam producing chemicals to the stream comprising a plurality of small injectors, an accumulating chamber into which said injectors discharge, a foam delivery pipe leading from said chamber at a point remote from said injectors, a valve controlling the flow of the stream to said injectors, a receptacle for chemicals positioned above said injectors, a valve for controlling the flow of chemicals to said injectors, and a spraying device for washing said chemicals into said injectors.

6. In apparatus for producing foam, means for producing a stream, means for storing foam producing chemicals, and means for the addition of the foam producing chemicals to the stream comprising a plurality of small injectors, a chamber into which said injectors discharge, a foam delivery pipe leading from said chamber, a valve controlling the flow of the stream to said injectors, a receptacle for chemicals positioned above said injectors, a valve for controlling the flow of chemicals to said injectors, and a single control device for operating said valves.

7. In apparatus for producing foam, means for producing a stream, means for storing foam producing chemicals, and means for the addition of the foam producing chemicals to the stream comprising a plurality of small injectors, a chamber into which said injectors discharge, a foam delivery pipe leading from said chamber, a valve controlling the flow of the stream to said injectors, a receptacle for chemicals positioned above said injectors, a valve for controlling the flow of chemicals to said injectors, and a single control device for operating said valves and arranged to completely open said stream control valve before opening said chemical control valve.

8. In apparatus for producing foam, means for producing a stream, means for storing foam producing chemicals, and means for the addition of the foam producing chemicals to the stream comprising a plurality of small injectors, an accumulating chamber into which said injectors discharge, a foam delivery pipe leading from said chamber at an angle to the axes of said injectors, a valve controlling the flow of the stream to said injectors, a receptacle for chemicals positioned above said injectors, a valve for controlling the flow of chemicals to said injectors, and a spraying device for washing said chemicals into said injectors connected to the pipe supplying the stream to said injectors, and a valve for controlling the flow through said spraying device.

9. In apparatus for producing foam, means for producing a stream, means for storing foam producing chemicals, and means for the addition of the foam producing chemicals to the stream comprising a plurality of small injectors, a chamber into which said injectors discharge, a foam delivery pipe leading from said chamber, a valve controlling the flow of the stream to said injectors, a receptacle for chemicals positioned above said injectors, a valve for controlling the flow of chemicals to said injectors, a spraying device for washing said chemicals into said injectors connected to the pipe supplying the stream to said injectors, a valve for controlling the flow through said spraying device, and a single control device for operating said injector stream control valve, said spraying device control valve, and said chemical flow control valve.

10. In apparatus for producing foam, means for producing a stream, means for storing foam producing chemicals, and means for the addition of the foam producing chemicals to the stream comprising a plurality of small injectors, a chamber into which said injectors discharge, a foam delivery pipe leading from said chamber, a valve controlling the flow of the stream to said injectors, a receptacle for chemicals positioned above said injectors, a valve for controlling the flow of chemicals to said injectors, a spraying device for washing said chemicals into said injectors connected to the pipe supplying the stream to said injectors, a valve for controlling the flow through said spraying device, and a single control device for operating said injector stream control valve, said spraying device control valve, and said chemical flow control valve, arranged to fully open said injector stream control valve and said spraying control valve prior to opening said chemical control valve.

11. In apparatus for producing foam, means for producing a stream, means for storing foam producing chemicals, and means for the addition of the foam producing chemicals to the stream comprising an injector operated by said stream, a chamber substantially larger than the foam delivery pipe into the lower portion of which said injector discharges, and a foam delivery pipe leading from the upper portion of said chamber.

12. In apparatus for producing foam, means for producing a stream, means for storing foam producing chemicals, and means for the addition of the foam producing chemicals to the stream comprising an injector, operated by said stream, a chamber substantially larger than the foam delivery pipe into the lower portion of which said injector discharges, a foam delivery pipe leading from the upper portion of said chamber, a valve controlling the flow of the stream to said injector, a receptacle for chemicals positioned above said injector, and a valve for controlling the flow of chemicals to said injector.

13. In apparatus for producing foam, means for producing a stream, means for storing foam producing chemicals, and means for the addition of the foam producing chemicals to the stream comprising a plurality of injectors arranged in parallel and adapted to be operated by said stream, a receptacle for solid chemicals and a separate receptacle for liquid chemicals positioned above said injectors, and means for simultaneously regulating the flow of said liquid chemicals and said solid chemicals respectively by gravity into said injectors at a predetermined rate.

HANS BURMEISTER.